(12) United States Patent
Fiske et al.

(10) Patent No.: US 6,873,235 B2
(45) Date of Patent: Mar. 29, 2005

(54) SHEAR FORCE LEVITATOR AND LEVITATED RING ENERGY STORAGE DEVICE

(75) Inventors: Orlo James Fiske, Goleta, CA (US); Chen Chen, Santa Barbara, CA (US); Michael Richard Ricci, Newbury Park, CA (US); Bradley Evan Paden, Santa Barbara, CA (US)

(73) Assignee: Magtube, Inc., Goleta, CA (US)

( * ) Notice: Subject to any disclaimer, the term of this patent is extended or adjusted under 35 U.S.C. 154(b) by 105 days.

(21) Appl. No.: 10/412,082

(22) Filed: Apr. 10, 2003

(65) Prior Publication Data

US 2003/0192449 A1 Oct. 16, 2003

Related U.S. Application Data

(60) Provisional application No. 60/372,722, filed on Apr. 11, 2002.

(51) Int. Cl.[7] ................................................. H02K 7/09
(52) U.S. Cl. ................. 335/306; 310/90.5; 310/154.01; 310/154.02; 310/154.43; 310/156.01; 310/156.07; 242/443
(58) Field of Search .......................... 335/216, 296–306; 310/90.5, 154.01, 154.02, 154.43, 156.01, 156.07; 242/443

(56) References Cited

U.S. PATENT DOCUMENTS

| | | |
|---|---|---|
| 3,158,765 A | 11/1964 | Polgreen |
| 3,407,749 A | 10/1968 | Frig |
| 3,791,309 A | 2/1974 | Baermann |
| 3,820,471 A | 6/1974 | Maki et al. |
| 3,885,504 A | 5/1975 | Baermann |
| 3,899,979 A | 8/1975 | Godsey, Jr. |
| 3,937,148 A | 2/1976 | Simpson |
| 3,976,339 A | 8/1976 | Sabnis |
| 4,356,772 A | 11/1982 | van der Heide |
| 4,486,729 A | 12/1984 | Lee |
| 4,646,651 A | 3/1987 | Yamamura et al. |
| 4,805,761 A | 2/1989 | Totsch |
| 5,094,173 A | 3/1992 | Tada et al. |
| 5,165,347 A | 11/1992 | Wagner |
| 5,243,919 A | 9/1993 | Ninomiya |
| 5,433,155 A | 7/1995 | O'Neill et al. |
| 5,436,516 A * | 7/1995 | Yamazaki et al. ......... 310/90.5 |
| 5,440,997 A | 8/1995 | Crowley |
| 5,601,029 A | 2/1997 | Geraghty et al. |
| 5,640,887 A * | 6/1997 | Hull et al. .................... 74/572 |
| 5,722,326 A | 3/1998 | Post |
| 6,374,746 B1 | 4/2002 | Fiske |
| 6,418,857 B1 | 7/2002 | Okano et al. |
| 6,684,794 B2 | 2/2004 | Fiske et al. |
| 2003/0005851 A1 | 1/2003 | Post |
| 2003/0006871 A1 | 1/2003 | Post |
| 2003/0052548 A1 | 3/2003 | Hol |

OTHER PUBLICATIONS

PCT International Search Report as issued in International Application No. PCT/US03/11007, Mailing date May 5, 2004.

* cited by examiner

Primary Examiner—Ramon M. Barrera

(57) ABSTRACT

One or more permanent magnets, or one or more permanent magnet arrays are used to produce shear force levitation. A primary application of shear force levitators is a levitated ring energy storage device. Such a levitated ring energy storage device includes a round support structure having a first magnetic levitator or levitator array encircling its outer periphery, and a ring encircling the support structure and having a second magnetic levitator or levitator array encircling its inner periphery, such that the first and second magnetic levitators (or levitator arrays) interact to produce a vertical force that levitates the ring.

48 Claims, 13 Drawing Sheets

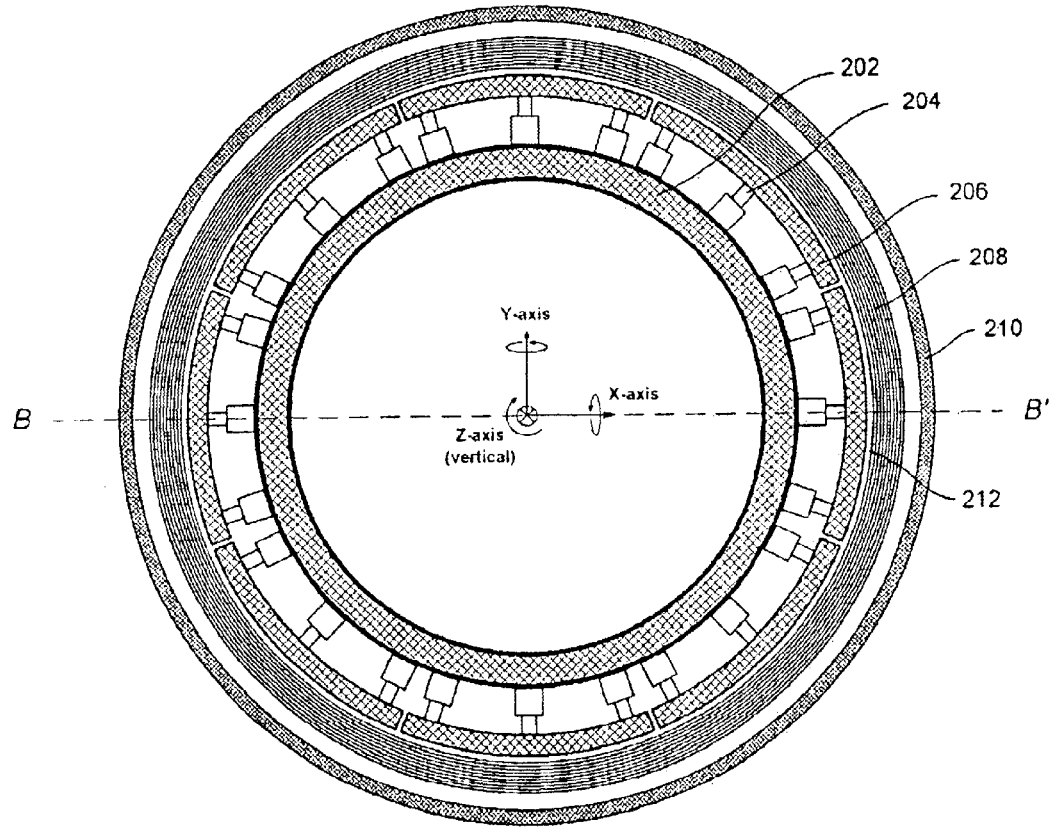

SHEAR FORCE LEVITATOR AND LEVITATED RING ENERGY STORAGE DEVICE

RELATED APPLICATIONS

This application claims priority under 35 USC §119(e) from U.S. Provisional Application No. 60/372,722, filed Apr. 11, 2002, the entirety of which is incorporated herein by reference.

This application is related to commonly-assigned U.S. patent application Ser. No. 10/140,729, filed May 7, 2002, the entirety of which is incorporated herein by reference.

BACKGROUND OF THE INVENTION

1. Field of the Invention

This invention relates generally to magnetic levitation and levitated kinetic energy storage devices.

2. Related Technology

The generation and distribution of electrical energy is critical to the normal operation of vast components of our industry and culture. Electricity is typically created as needed through the combustion of carbon-based fuels, conversion of water power, fission of radioactive elements, and various other techniques. However in many instances it is desirable to store electricity for use at a later time. For example, stored electricity can improve power supply quality by providing "ride-through" for momentary outages, reducing harmonic distortions, and eliminating voltage sags and surges. Stored electricity also increases the value of renewable energies such as photovoltaic, wind and wave-generated electricity by allowing that energy to be stored and supplied later at periods of peak consumer demand. Stored electricity may be held in reserve to prevent interruptions of service by the failure of an operating generating station or transmission link. Inexpensive off-peak electricity may also be stored for use during relatively expensive on-peak hours. The ability to store electricity also enables a utility to postpone construction of additional generating capacity or installation of new transmission or distribution lines and transformers by supplementing the existing facilities with stored resources as demand growth approaches capacity.

A variety of technologies for electrical energy storage are in current use or development. The pumped hydro technique utilizes two large reservoirs at different elevations. Water is pumped to the high reservoir and stored as potential energy. Upon demand, water is released through hydraulic turbines into the low reservoir to generate up to 1000 MW. Compressed air energy storage (CAES) uses off-peak energy to compress and store air in underground caverns or large buried pipes. Upon demand, stored air is released, heated and expanded through a combustion turbine to create electrical energy. Batteries use an electrochemical reaction to store energy in a chemical form. Upon demand, reverse chemical reactions cause electricity to flow out of the battery and back to the grid. Batteries are manufactured in capacities ranging from milliwatts to modular configurations of megawatts. Superconducting magnetic energy storage (SMES) stores energy in the magnetic field created by the flow of direct current in a coil of superconducting material immersed in liquid helium and contained in a vacuum-insulated cryostat. Ultracapacitors are comprised of two oppositely charged electrodes, a separator, an electrolyte and current collectors. Charge is stored by ions as in a battery but no chemical reaction takes place. Flywheels utilize a disk spun up to high velocity by a motor/generator to store power as kinetic energy. Upon demand that energy is extracted by the generator as electrical power. The use of magnetic bearings and a vacuum chamber helps reduce energy losses.

The primary barrier to increased use of the aforementioned storage technologies is installation costs. Batteries, flywheels, SMES, and ultracapacitors all cost far too much to be used in large installations. CAES systems can be scaled up to moderately large capacity, but need a constant supply of fuel. They are similar in size and characteristics to conventional turbine power plants, i.e. large and noisy, making them impractical in many areas. They also have a cold startup time of 15 minutes, making them unusable in some applications. Pumped hydro was the premier storage system for decades, with over 22 gigawatts of capacity installed in the U.S., but geographic, geologic and environmental constraints associated with reservoir design as well as increased construction costs have made them impractical for future expansion. Thus far no technology has been discovered that is capable of cost-effectively replacing pumped hydro. Therefore the industry badly needs a fundamentally new approach to circumvent existing problems.

With the advent of high strength, lightweight materials such as carbon fiber, flywheels showed promise as primary energy storage devices. Flywheels of this kind have proven capable of providing high power and relatively high storage capacity per unit mass, but do not scale up well. FIG. 1a illustrates the basic design of a current technology flywheel. In flywheel system 8 a flywheel rim 18 is attached by spokes or hub 16 to a central shaft 10, which is supported by bearings 12. The bearings 12 may be mechanical bearings such as ball bearings or, as is generally the case in high performance flywheels, non-contact magnetic bearings. A motor-generator 14 operates as a motor to spin the flywheel up to speed to store energy, and as a generator to extract stored energy. The kinetic energy stored in the rotor (rim) is proportional to the mass of the rotor and the square of its velocity. The stored kinetic energy, K.E., is:

$$K.E. = \tfrac{1}{2} J \omega^2 = \tfrac{1}{2} k m r^2 \omega^2 \tag{1}$$

where $\omega$ is the rate of rotation in radians per second, J is the moment of inertia about the axis of rotation in kilogram-meters squared, m is rotor mass, r is the effective rotor radius (also known as the radius of gyration), and k is an inertial constant dependent on rotor shape. For a solid disk of uniform thickness, $k=\tfrac{1}{2}$. If the rotor is a thin ring, $k=1$. In other words, a spinning ring contains twice as much kinetic energy per unit mass as a spinning cylinder.

The stress produced in the rim is proportional to the square of the linear velocity at the tip or outside diameter of the rim. When rim speed is limited by the tensile strength of the rim material, the maximum linear tip velocity is constant, regardless of radius. The maximum rotation rate is then inversely proportional to rim diameter. For example, if a particular material allows a rotor tip speed of 1000 meters per second, a 0.5 meter diameter rim would have a maximum spin rate of 39,000 RPM, whereas a 2-meter rim constructed of the same material would have a maximum spin rate of 9550 RPM.

For maximum stored energy the rim must be spun at the highest possible speed. Therefore the best materials for rim construction are not the densest or the strongest, but rather they are those with the highest specific strength, i.e. the ratio of ultimate tensile strength to density. For a thin rim, the relationship between maximum rim stress and specific energy or energy stored per unit mass of rim is:

$$K.E./m = \sigma_h / 2\rho \tag{2}$$

where $\sigma_h$ is the maximum hoop stress the rim can withstand in $N/m^2$ and $\rho$ is the density of the rim material in $kg/m^3$. In other words, specific energy corresponds directly to the specific strength $\sigma_h/\rho$ of the material from which the rim is formed. Accordingly, filament-wound rims made of high strength, low density fibers store more energy per unit weight than metal rims. Carbon fiber rims have attained tip speeds in excess of 1000 meters per second. These rims are typically housed in evacuated chambers to minimize energy losses due to air drag and to eliminate aerodynamic heating.

As rotational velocity increases, the centrifugal force on the rim 18 is greater than the centrifugal force on the shaft 10 and so the rim 18 expands faster than shaft 10. The spoke assembly 16 must compensate for this differential in rate of growth while maintaining a secure bond with the rim. The resulting stress concentrations are illustrated in FIG. 1b. High-speed carbon composite rims can expand by more than 1% in normal operation. Other materials, such as E-glass, can expand even more. This relative growth makes hub design one of the limiting factors in flywheel diameter. One common failure mode resulting from this differential growth is separation of the rim from the hub caused by hoop stress, which is highest at the inner boundary of the flywheel and decreases rapidly from the inner boundary of the rim to the outer boundary. Another common failure mode is delamination of the layers of fibers that make up the rim. These fibers are extremely strong along their length but are held together in the radial direction only by relatively weak epoxy binder. The thicker the rim is in the radial direction, the higher the delaminating forces become.

Many methods have been proposed to alleviate this problem, usually involving exotic materials or complicated flywheel structures. However, these techniques are very expensive and are only useful for flywheels of rather modest size, usually well under a meter in diameter. One technique involves the use of multiple filament-wound rims separated by elastomeric interlayers to prevent the radial transmission of tensile stresses between the various rims. To obtain the highest speed and minimize costs, high strength carbon fiber is used in the outermost rims, while lower strength (and cost) carbon fiber or glass is used for the inner rims. Other techniques include varying the density of the rim as a function of radius by means of ballasting, e.g. with lead particles, and using a combination of layers of fibers each having a different modulus of elasticity. Another technique, depicted in FIGS. 2a and 2b, is described in U.S. Pat. No. 6,211,589. Instead of multiple concentric rims, this rotor 32 is a simple thin-rimmed wheel, greatly decreasing the differential stress problem in a much less complex way. A relatively thin rim is less subject to differential stress and capable of higher rotation rates. As described previously, this also results in higher energy content per unit mass of rotor material. The rotor is supported by spoke assembly 34 and magnetic bearing assembly 36, and spins around shaft 38. The spokes are constructed such that they stretch as the flywheel spins up, in theory allowing them to compensate for expansion of the wheel and thereby eliminating the separation problem. However in actual operation this structure has proven to be unstable.

A different technique is to eliminate the hub and spoke assemblies entirely to create a simple spinning ring. With no hub assembly the failure mode in which the rim separates from the hub no longer pertains. FIG. 3 shows a cross section of a ring system using permanent magnet bearings as disclosed by Lee, Kwan-Chul; Chung, Kie-Hyung; Kim; Dong-Il; Cho, Chang-Ho, "Conceptual design of a hoop energy storage system," Journal of Applied Physics, Vol. 81, No. 8, April 1997. This system 40 utilizes a spinning composite ring 42 having permanent magnets 44 and 46 provided underneath the ring 42 for levitation. Permanent magnets 48 and 50 located along the inside diameter provide stabilization. A motor/generator 52 injects and extracts energy.

While the use of permanent magnet bearings has the potential for low induced currents and drag, the aforementioned magnet configuration has fundamental problems. Simple opposed magnets provide relatively low levitation force per unit area, resulting in limited spinning mass and low energy storage capacity or a high cost for magnets. Further, simple opposed stabilization magnets do not provide stability due to the constraints of Earnshaw's theorem. Without additional restraint or control the ring will immediately slide into contact with the support structure. Ring expansion due to rotation-induced stress widens the gap between the stationary and spinning stabilization magnets as speed increases, further weakening their affect. Further, the permanent magnets attached to the underside of the ring will be subject to intense lateral forces due to high speed ring rotation. Permanent magnets such as neodymium-iron-boron provide high field strength, but have low tensile strength. If not carefully supported, these magnets can easily be shattered by lateral forces causing the ring to crash and self-destruct. In addition, the thick structure of the ring also results in differential stress and expansion problems as encountered in conventional flywheel designs. Thus the rotation rate of the ring must be severely limited or it will delaminate.

The idea of a hubless flywheel continues to have merit, but for such a design to succeed it must offer a number of features, including stable levitation with low eddy current drag, efficient use of permanent magnets to keep costs low, a method to prevent ring expansion from disabling the stabilization and/or levitation, a method to prevent ring expansion from delaminating and destroying the ring itself, and a method to mount and support permanent magnets on the ring such that intense lateral forces will not shatter them. These features are not offered by the current technology.

SUMMARY OF THE INVENTION

Embodiments of the invention utilize at least one permanent magnet shear force levitator to provide shear force levitation of an object. The magnet shear force levitator may have at least one or, more preferably, one or more arrays of magnetic levitators. The arrays may be optimized to reduce magnet mass and minimize electrodynamic drag while maximizing their lifting field by configuring them as Halbach arrays, which have rotating magnetization, and have a cupped shape. Shear force levitators have many potential applications such as vehicle levitation or industrial conveyance where it is more convenient or effective to place the levitator beside the object to be levitated rather than below or above it.

A primary application of shear force levitators is a levitated ring energy storage device. In accordance with embodiments of the invention, such a device includes a round support structure having a first magnetic levitator array encircling its outer periphery, and a ring encircling the support structure and having a second magnetic levitator array encircling its inner periphery, such that the first and second magnetic levitator arrays interact to produce a vertical force that levitates the ring.

More particularly, magnet arrays are attached to a non-spinning support structure and interact with magnet arrays mounted on a spinning ring to provide shear force levitation.

This allows the spinning magnet elements to be mounted on the inner surface of the ring where they are supported against centrifugal force by the ring itself. Ring motion is stabilized by stationary feedback-controlled actuators and/or dampers interacting with magnet arrays on the ring, or by a variety of other techniques. The ring is constructed of high strength material and optimally shaped to allow extreme rotation speeds and maximum energy storage per unit of mass. The wall-thickness of the spinning ring is much smaller than the ring radius to minimize radial and hoop stress gradients. In very large diameter rings an expanding, non-spinning support structure compensates for stress-induced expansion of the ring. Storage rings with diameters exceeding 100 meters, a spinning mass of more than 1000 metric tons, and a storage capacity of more than 100 megawatt-hours are feasible.

DESCRIPTION OF THE DRAWINGS

FIG. 2b shows a cross-sectional view of the flywheel system of FIG. 2a.

FIG. 4b shows vertical and lateral forces as a function of lateral offset in the arrays depicted in FIG. 4a.

FIG. 5b depicts a section of the structure of FIG. 5a.

FIG. 7b shows a partial cutaway view of the energy storage ring of FIG. 7a.

FIG. 8b shows an expanded view of a portion of the energy storage ring of FIG. 8a.

FIG. 9a shows the top view of a fourth preferred embodiment of the energy storage ring.

FIG. 9b depicts a section of the structure of FIG. 9a.

DETAILED DESCRIPTION OF PREFERRED EMBODIMENTS

Figure 1A:
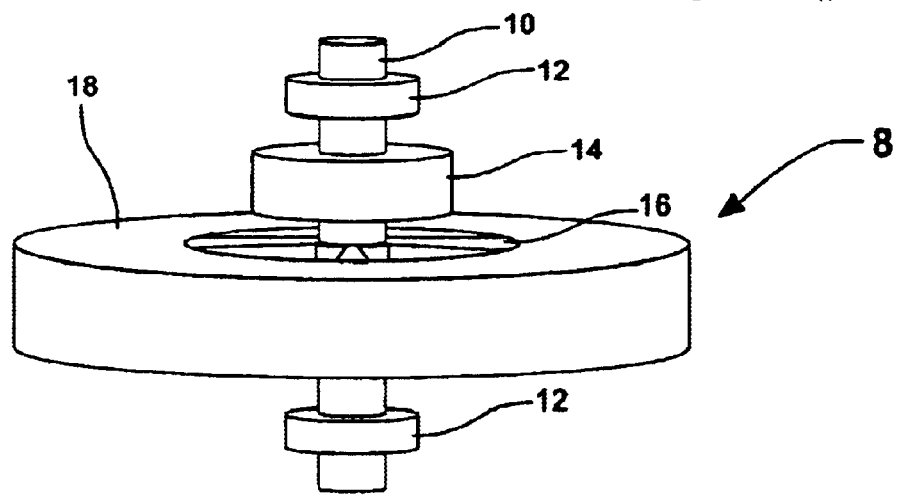
FIG. 1a shows the general structure of a conventional flywheel energy storage device.
Figure 1B:
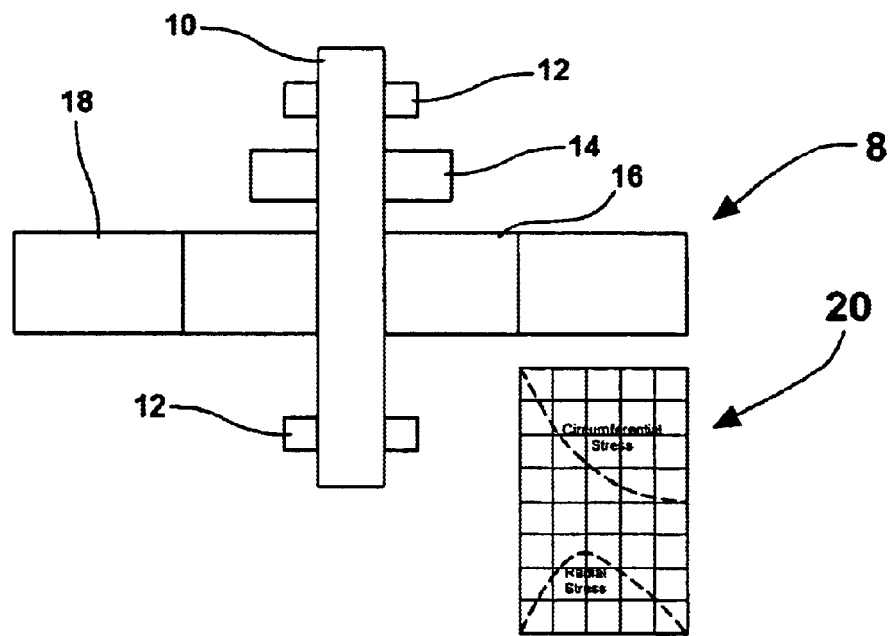
FIG. 1b shows a cross-sectional view of the flywheel device of FIG. 1a with a graph showing the spin-induced hoop stress and radial stress as a function of distance from the flywheel axle.
Figure 2A:
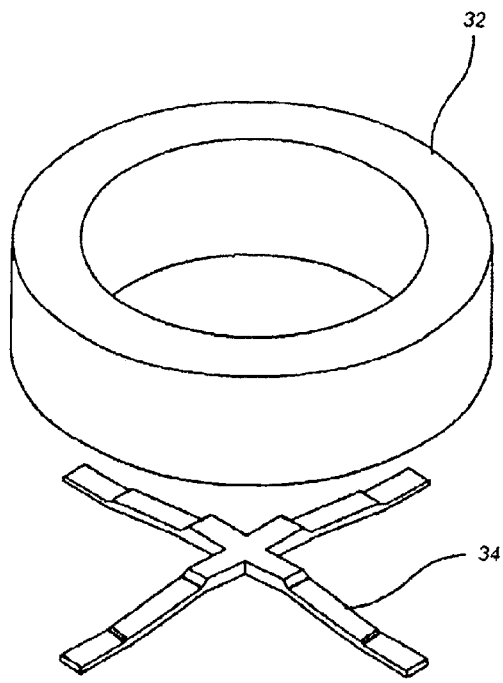
FIG. 2a shows the primary structural elements of another conventional flywheel system.
Figure 2B:
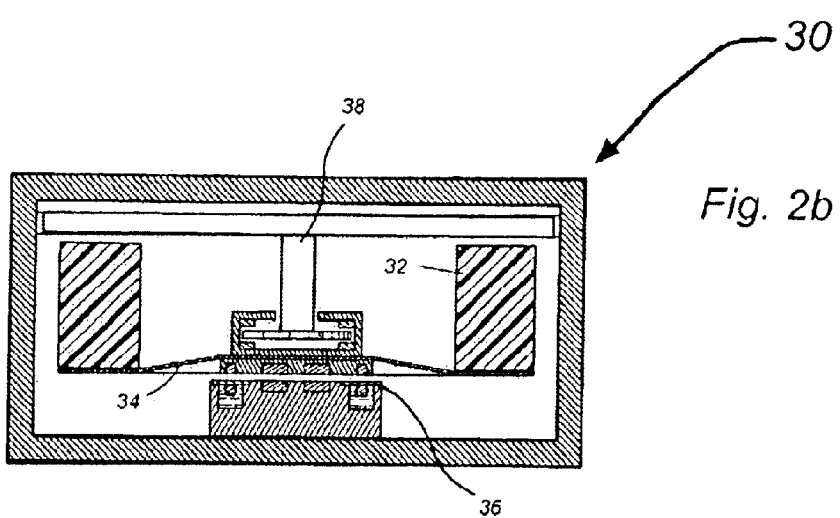
Figure 3:
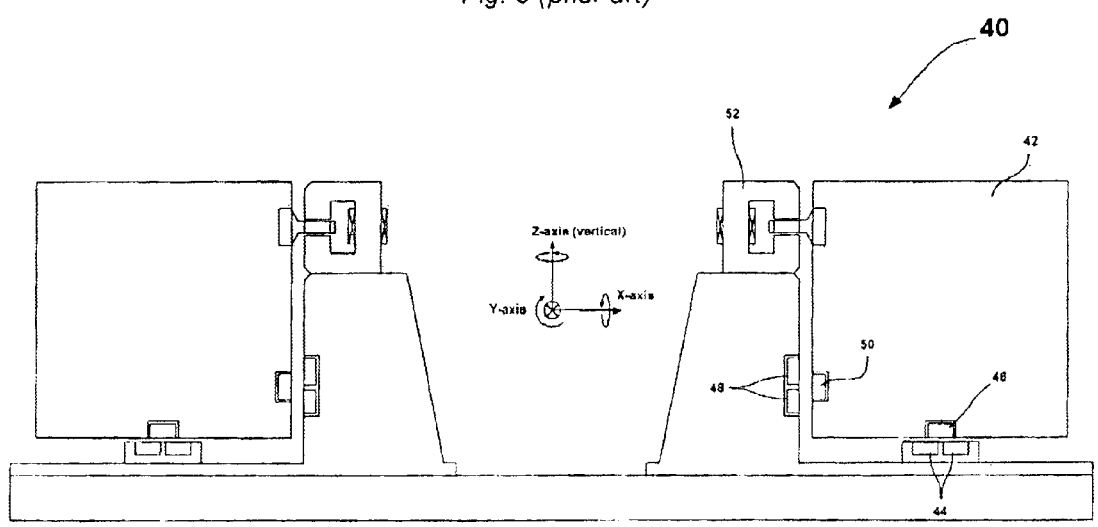
FIG. 3 shows a previously proposed hoop energy storage system using magnetic levitation.
Figure 4A:
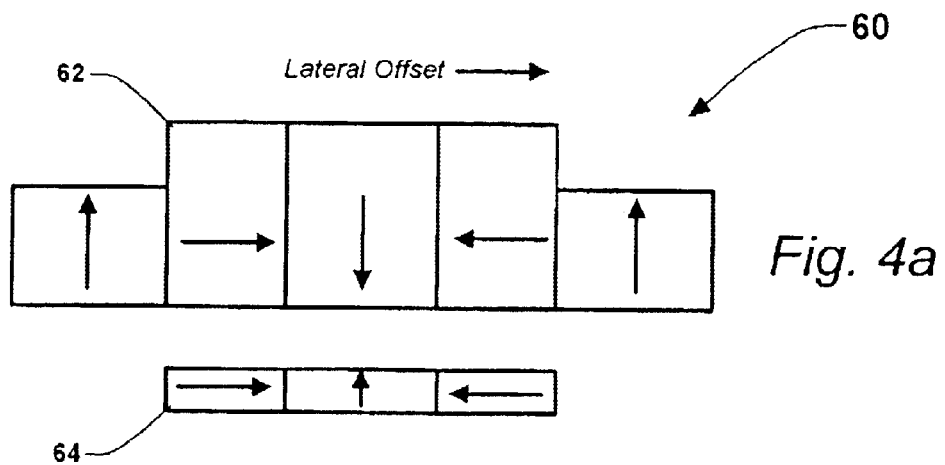
FIG. 4a depicts permanent magnet arrays that are optimized for vehicle levitation.

FIG. 4a shows vertically oriented levitator system 60 in which a set of opposed permanent magnet arrays provides a large levitation force per mass unit of magnet, as described in U.S. patent application Ser. No. 10/140,729. A first array 62 is comprised of five magnets arranged to have a rotating magnetization. The polarities of the magnets, shown by arrows in the drawing, are arranged such that the direction of magnetization of each magnet is rotated ninety degrees in a common direction relative to a preceding adjacent magnet. This rotation serves to focus the magnetic field of the array toward the active surface at the expense of the unused surface opposite to the active surface. A second array 64 is comprised of three magnets, the polarities of which are also each rotated by ninety degrees as indicated by the arrows. In a vehicle levitation deployment, the first array 62 is installed on a vehicle or other object to be levitated, and the second array 64 is installed on a track or stationary support structure in opposition to the first array 62. Because a track tends to be much longer than the vehicle that rides on that track, the overall levitator design places more emphasis on minimizing the size and cost of the track array than the vehicle array, hence the difference in the sizes of the arrays. While this example employs arrays having three and five magnets respectively, arrays having larger or smaller numbers of magnets may also be employed. The array configuration of FIG. 4a provides a large improvement in levitation force per mass unit of magnet as compared to other permanent magnet designs. However, while this configuration provides stable forces in the vertical direction, it produces unstable forces in the lateral directions, and if left to itself the vehicle magnet will rapidly slide to one side or the other. Stabilization of the vehicle/track levitation system is therefore required, as described in U.S. patent application Ser. No. 10/140,729.

Figure 4B:
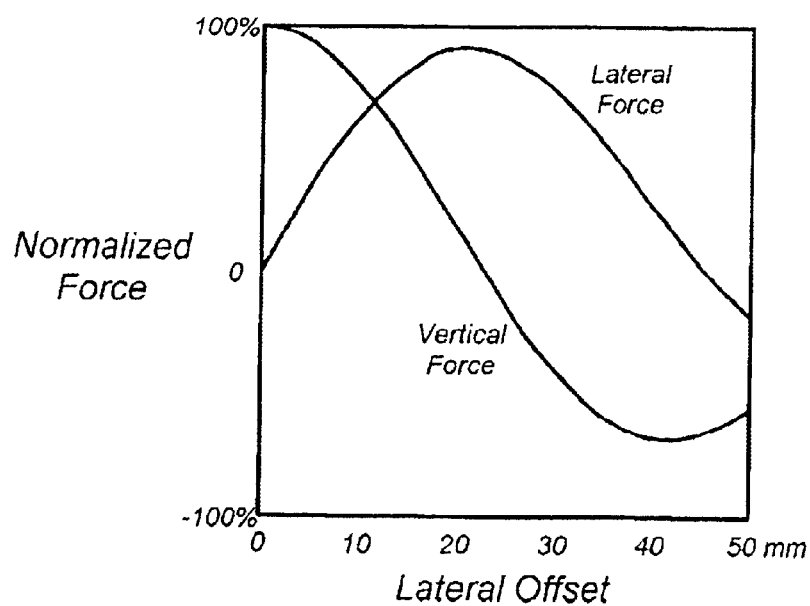

FIG. 4b is a graph of the normalized vertical and lateral forces produced by the levitator of FIG. 4a as the vehicle array 62 is offset laterally to the right. This particular graph was produced by finite element analysis of the interaction of two neodymium-iron-boron magnet arrays. If the scale of FIG. 4a is taken such that the width of the vehicle magnet array is 115 millimeters, then the height of that array is 30 millimeters and it is levitated 20 millimeters above a track array having a width of 64 millimeters and a height of 7 millimeters. The graph shows that as the offset increases the vertical force decreases. At just over 20 mm offset, vertical force reaches zero then continues to go negative, i.e. it becomes an attractive rather than a repulsive force. Meanwhile the lateral force is zero at a lateral offset of zero and increases until offset is about 20 mm, at which point it reaches nearly the same value as the zero-offset vertical force, and after which it begins to decrease. From this it is seen that the arrays can be used to generate force in either the vertical direction or the lateral direction, depending on their orientation.

Figure 4C:
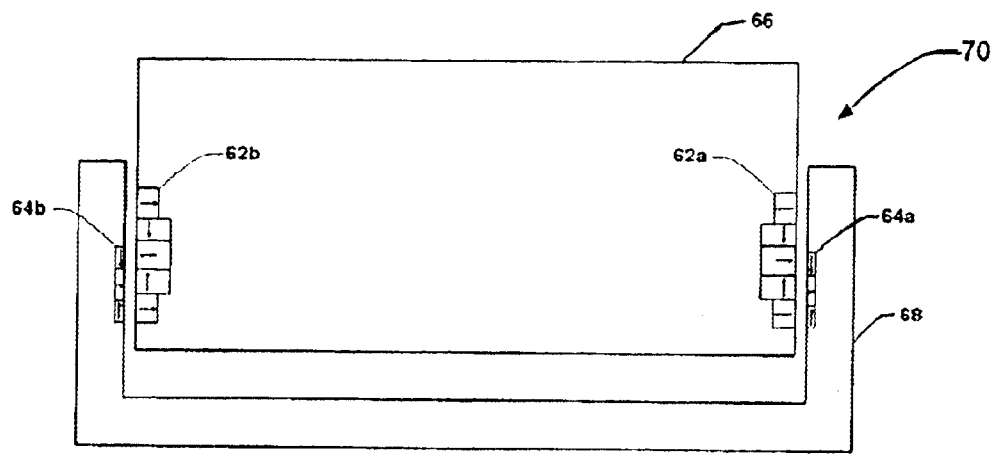
FIG. 4c shows a rearrangement of the magnet arrays of FIG. 4a to provide a shear force levitator configuration.

FIG. 4c shows a sectional view of an arrangement 70 of the magnet arrays of FIG. 4a for levitating an object or vehicle using shear force. Levitator arrays 62a and 62b are mounted on an object or vehicle 66 to be levitated, and levitator arrays 64a and 64b are mounted on a track or guideway 68. Object motion is assumed to be into or out of the paper. The track levitator arrays are offset approximately 30 mm beneath the object levitator arrays. In this orientation the force generated by the interaction of the levitator arrays is applied in the vertical direction with respect to gravity.

Force oriented in this manner will be referred to hereinafter as "shear force." This shear force levitator, like the levitator 60 in FIG. 4a, is laterally unstable and may be stabilized by means of the techniques described in U.S. patent application Ser. No. 10/140,729. Although the embodiment of FIG. 4c shows guideway 68 wrapped around the vehicle or object to be levitated, in other embodiments the vehicle or object to be levitated may wrap around the guideway.

Figure 4D:
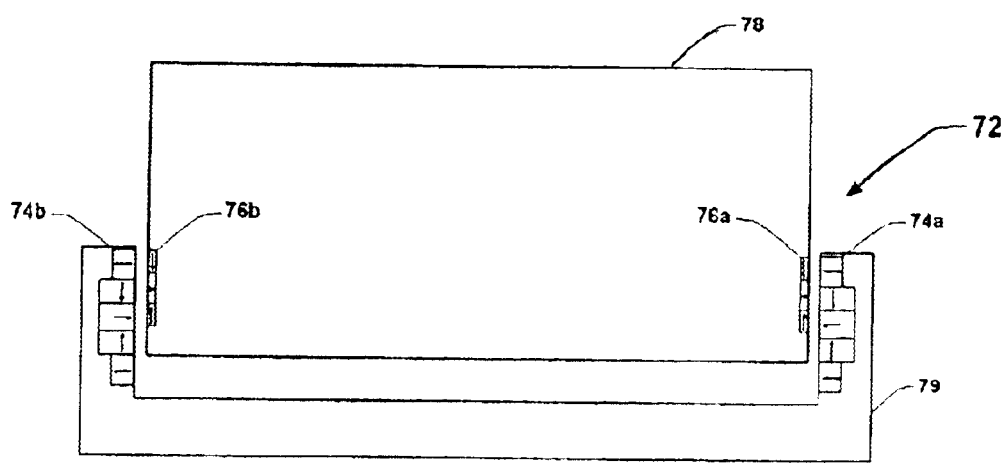
FIG. 4d shows a second rearrangement of the magnet arrays of FIG. 4a to provide a second shear force levitator configuration.

FIG. 4d shows an alternative embodiment of a shear force object levitator 72 in which the locations of the respective levitator arrays on the track and the object are reversed. In this embodiment, the smaller levitator arrays 76a and 76b are mounted on the object or vehicle 78, while the larger levitator arrays 74a and 74b are attached to the guideway or track 79. This configuration is useful where small size and/or weight is more important for the moving array than the stationary array.

Figure 4E:
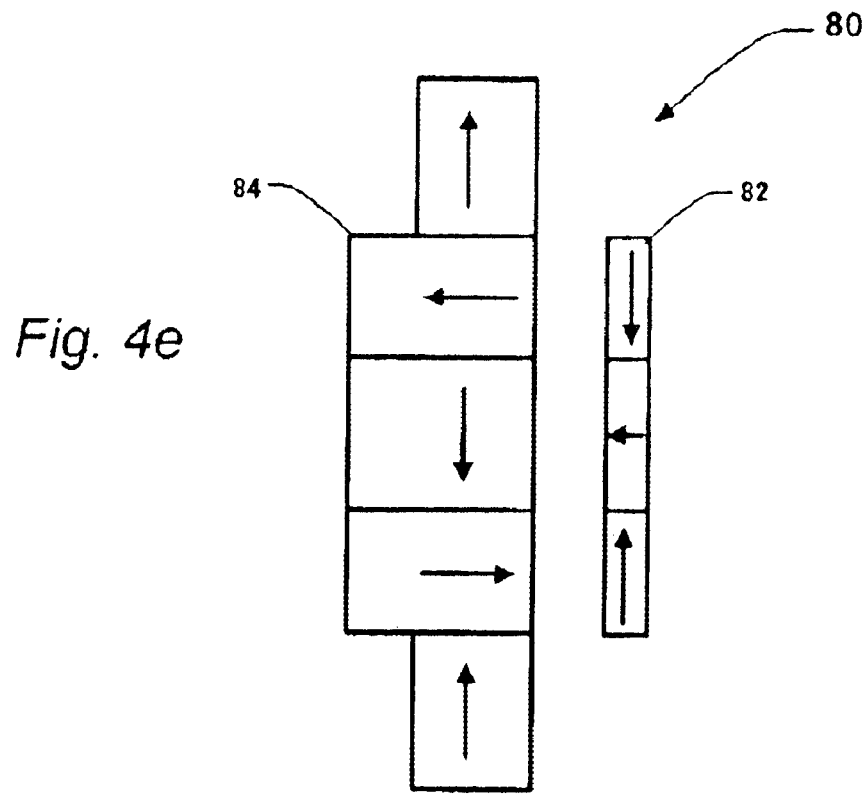
FIG. 4e shows an optimized configuration of the magnet arrays of a shear force levitator.
Figure 4F:
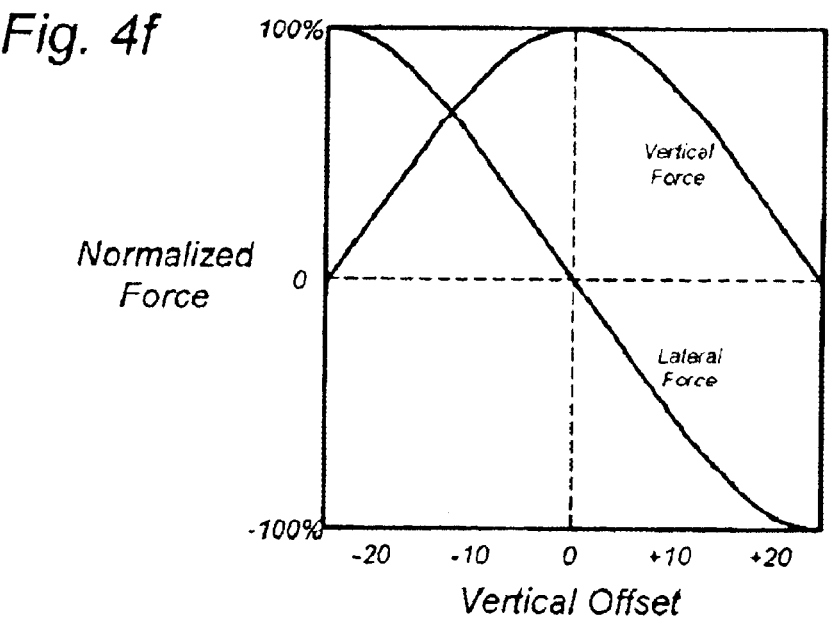
FIG. 4f shows vertical and lateral forces as a function of vertical offset in the arrays depicted in FIG. 4e.

FIG. 4e shows a further embodiment of a levitator 80, in which the magnets of levitator arrays 82 and 84 are provided with different orientations from those of the levitator arrays of FIG. 4a in order to provide maximum shear force. Levitator array 84 is assumed to be the stationary element, and interacts with levitator array 82 to produce a large vertical force. FIG. 4f graphs the vertical and lateral forces produced by interaction of the levitator arrays 82 and 84 as they move vertically with respect to each other in the orientation shown in FIG. 4e. It is seen that in this orientation the maximum vertical force is generated when the levitator arrays 82, 84 are directly opposite to one another. In application, it will therefore be desired to have a vehicle or object weight that is less than the maximum vertical repulsive force, so that any additional weight applied to the vehicle will be resisted bun increased force between the levitator arrays. Other optimizations using other orientations may be implemented depending upon the requirements of the particular application.

These optimized permanent magnet shear force levitators have many potential applications such as vehicle levitation or industrial conveyance, and in any application where it is more convenient or effective to place levitators beside the object to be levitated rather than below or above it.

Figure 5A:
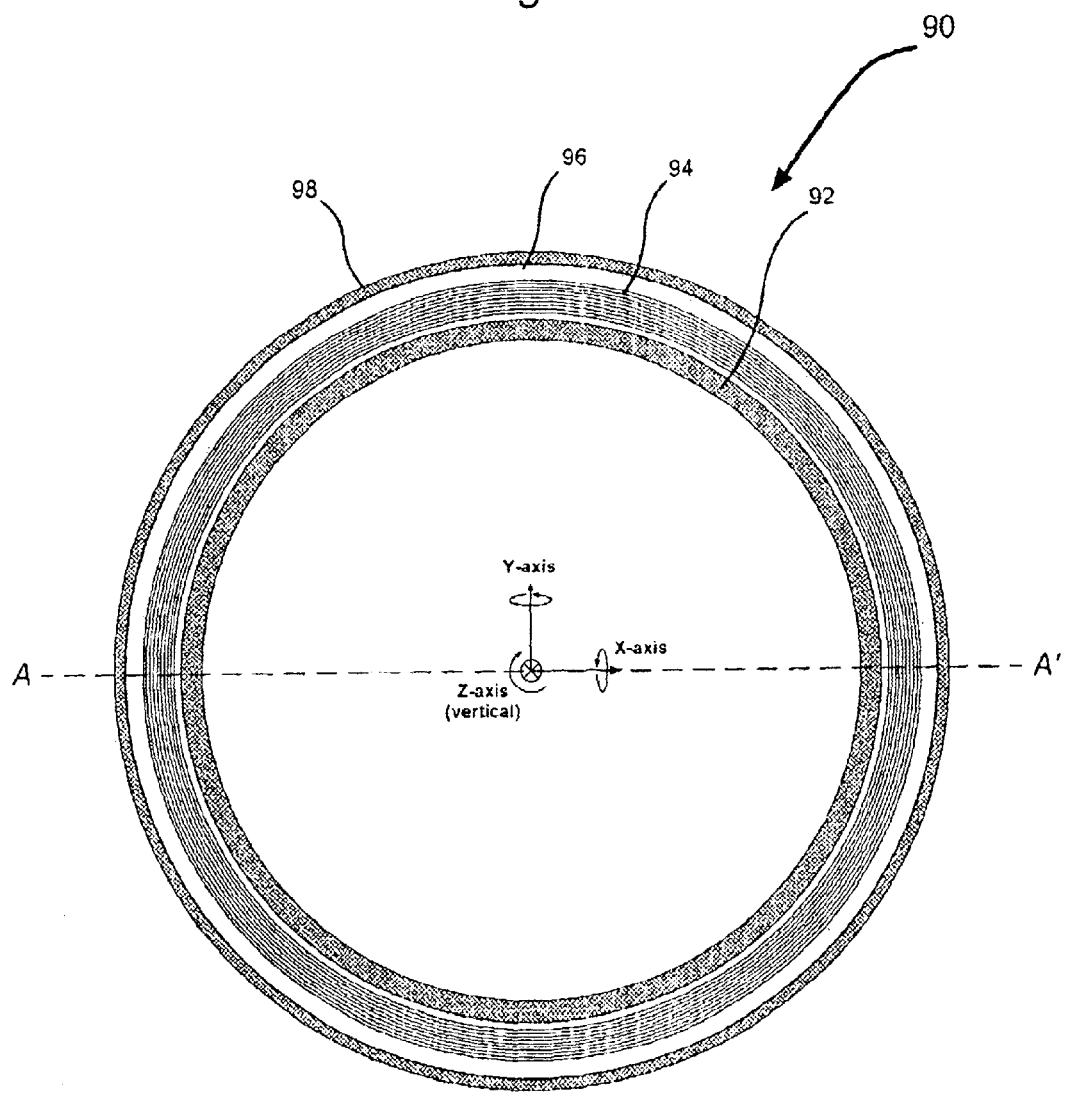
FIG. 5a shows a plan view of a first preferred embodiment of the energy storage ring.

One particularly important application is shown in FIG. 5a, which is a plan view of a first preferred embodiment of a levitated ring energy storage device 90. A stationary inner containment wall 92 of a containment vessel supports the stationary elements of a shear force levitator (not shown). Storage ring 94 spins within the containment vessel in a vacuum chamber 96. An outer containment wall 98 of the containment vessel prevents the ring or any of its components from traveling outside of chamber 96 in the case of ring failure.

Figure 5B:
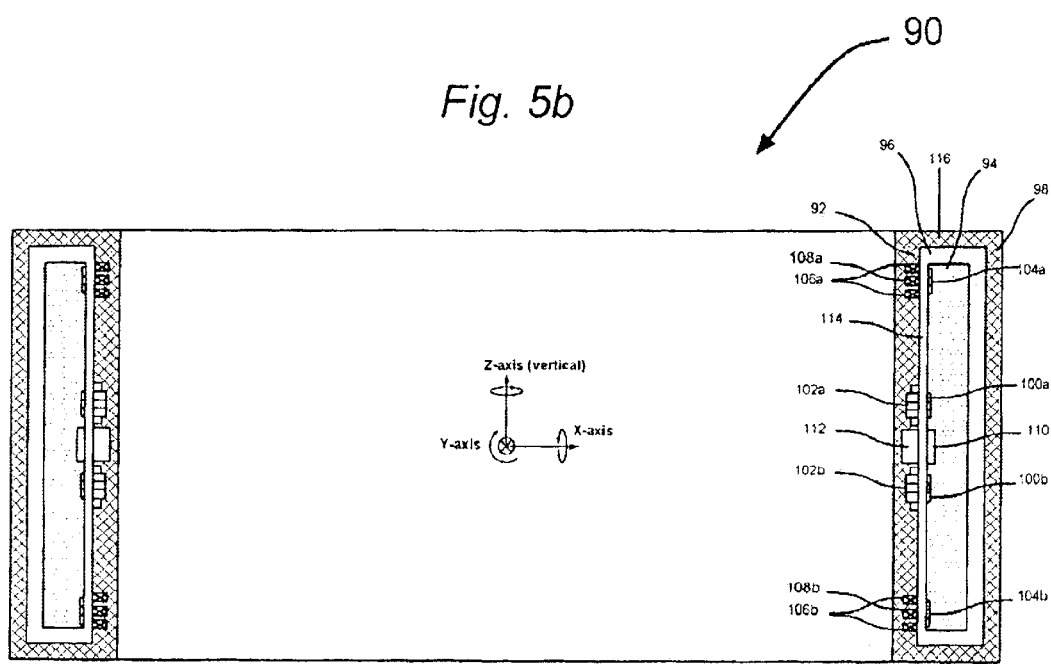

FIG. 5b depicts a section of the embodiment of FIG. 5a along line A–A'. Moving levitator arrays 100a and 100b are embedded in spinning ring 94, which is levitated inside vacuum chamber 96, and are continuous around the inside surface of the ring 94. Stationary levitator arrays 102a and 102b are embedded in the inner containment wall 92 and are continuous around the circumference of the wall 92. The larger levitator arrays are mounted on the stationary wall while the smaller levitator arrays are mounted on the spinning ring. This minimizes the addition of non-structural mass to the ring, maximizing the achievable rotation rate and thus the energy storage capacity per unit of mass. Two levitator arrays are shown, but more or fewer may be used. Stabilization magnet arrays 104a and 104b embedded in spinning ring 94 oppose lateral stabilization coils 106a and 106b and vertical stabilization coils 108a and 108b embedded in the inner containment wall 92. A motor/generator permanent magnet array 110 in spinning ring 94 opposes motor/generator coils 112 embedded in the inner containment wall 92. The stabilization magnet arrays and motor/generator magnet arrays are continuous around the inner surface of the ring 94.

In operation, electricity may be supplied to the motor/generator to spin up the ring to store energy in the form of momentum, and energy may be extracted from the ring in the form of electricity. The ring 94 expands as its rotational velocity increases, but unlike conventional flywheels, this expansion does not cause a stress concentration and potential failure at a hub-rim interface, but rather simply widens the gap 114 between the ring 94 and the inner containment wall 92. This expansion also widens the gap between the opposing magnet arrays of the levitators, actuators, and motor generator. Using neodymium-iron-boron magnets, the type most cost effective in this application, the shear force levitator can be sized to allow a gap width of up to several centimeters while still supplying adequate force to levitate the ring. The variable gap must also be addressed in the design of the lateral actuators and the motor generator.

The maximum allowable gap width has a direct effect on the maximum achievable ring diameter. If ring stretch is limited to 50% of maximum fiber elongation (max elongation is about 5% for E-glass) for safety and this corresponds to a 3 cm gap, the maximum allowable E-glass rotor is about 2.4 meters in diameter when not spinning. Carbon fiber, with a maximum elongation of about 2%, can be used for rings up to 6 meters in diameter, which is more than 12 times the diameter of the largest carbon composite flywheels in commercial use today. There is no fundamental limit to the axial length of these rings since the number of levitators can be increased as the axial length increases. This configuration makes it practical to construct energy storage rings with hundreds to thousands of times the energy capacity of conventional flywheels.

This design is also advantageous in applications where high output power is required. Generator power is proportional to the volume of copper winding influenced by the generator magnetic field. For a given thickness of copper windings, power is therefore proportional to the area of the magnets. The large diameters feasible with storage ring 90 can provide a very large magnet area compared to conventional flywheels and generators. Power also depends upon the relative speed of the magnets with respect to the copper. In order to maintain structural integrity, the generator in a conventional flywheel has a much smaller diameter than the wheel rim, thus decreasing its linear speed and power capability. In storage ring 90 the generator is nearly the same diameter as the ring, giving it very high speed. These two factors combine to provide high output power in a relatively small unit. Assuming the flux density produced by the generator magnets is 0.6 Tesla, the peak current density in the generator windings is limited to 20 amps per square millimeter, the winding is 20 millimeters thick, and the output is three phase sinusoidal, the generator will produce approximately 7 Newtons of force per square centimeter. At a rotor tip speed of 500 meters per second this will provide over 30 MW per square meter of generator magnet.

Gap sensors (not shown), such as eddy current sensors, Hall effect sensors, optical sensors or the like, are preferably employed to continuously measure gap width 114 at several locations near the top and the bottom of the ring 94. Gap measurements are used to provide computer monitoring of ring position with respect to inner containment wall 92. Ring position and vibration must be controlled, and to ensure stable rotation of the ring all six degrees of freedom must be accounted for: linear motion in the X, Y, and Z directions and rotation about the X, Y, and Z axes. Placing the levitators near the vertical center of the ring minimizes the lateral component of any rotation about the X or Y (horizontal) axes, thereby minimizing lateral instability. Since vertical motion of the moving side of the shear force levitators is passively stable, the ring is stable in the Z direction and in rotation about the X and Y axes. Thus four of the six degrees of freedom do not contribute to instability, leaving only linear motion in the X and Y directions to be actively controlled. This is accomplished by lateral actuators.

Figure 6A:
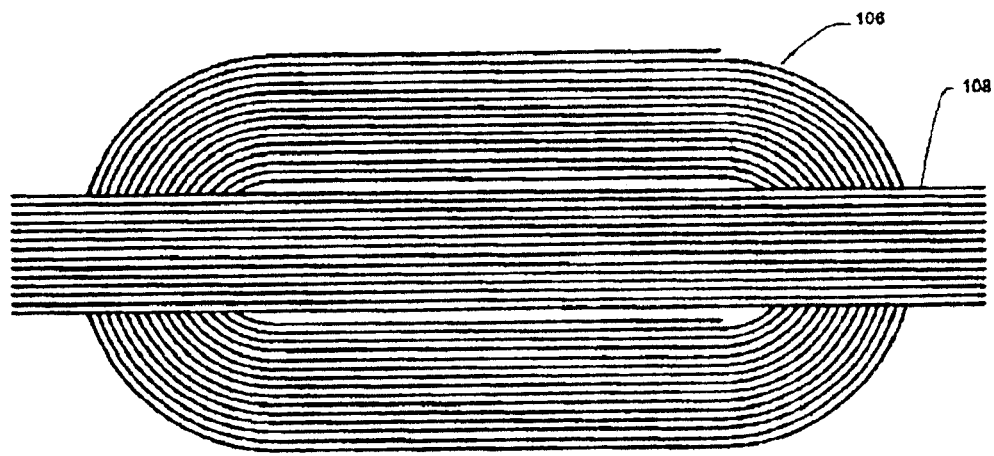
FIG. 6a shows a view of the lateral and vertical stabilization coils of FIG. 5b as seen from the position of the spinning ring.
Figure 6B:
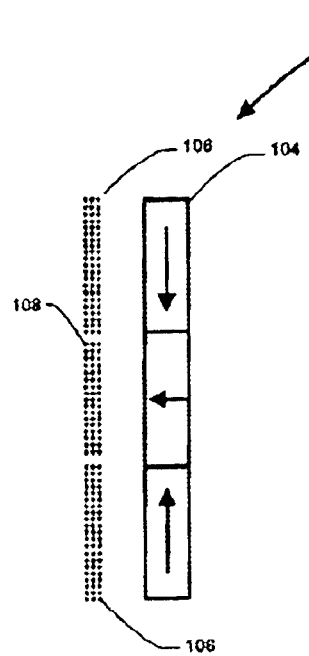
FIG. 6b shows a cross-sectional view of the lateral and vertical stabilization coils in relation to the moving stabilization magnet array of FIG. 5b.

FIG. 6a shows a plan view of an embodiment of stabilization coils 106, 108 that are embedded in the inner containment wall 92 as shown in FIG. 5b. FIG. 6b shows a cross-sectional view of the stabilization coils 106 and 108 of FIG. 6a in relation to the stabilization magnet array 104 provided on the ring 94. A lateral stabilization coil 106 is configured as a voice coil. When the lateral stabilization coil is energized, a repulsive or attractive force is produced with respect to the moving magnet array 104. Lateral stabilization coils of this type are placed at suitable intervals around the circumference of inner containment wall 92. The control computer energizes these coils as necessary to offset undesirable lateral movement of ring 94, thereby keeping it properly centered and damping unwanted vibrations. Although voice coils are shown, other types of actuators as described in U.S. patent application Ser. No. 10/140,729 may be used to effect the same control function.

A vertical stabilization coil 108 wraps all the way around the circumference of inner containment wall 92. When electrical current is passed through the vertical stabilization coil 108 a positive or negative vertical force is produced with respect to moving magnet array 104. The control computer energizes this coil as necessary to stabilize unwanted vertical motions of ring 94. Even without computer control, vertical motion of stabilization magnet array 104 in FIG. 6b will encounter resistance due to currents that the array induces in coil 108, thereby stabilizing vertical vibration. In other embodiments the vertical stabilizing coil 108 may be segmented and the segments may be individually controlled in cooperation with the lateral stabilization coils to stabilize vertical and conical vibration modes. The vibrational modes that typically occur in the ring are usually excited by nonuniformities in the suspension or other sources. Since these vibrations are small, linear control methods such as linear quadratic regulator designs or H-infinity designs can be applied. Since the modal frequencies depend on the rotational speed, the type of controller may change with speed. Methods for designing the change may include gain-scheduling or linear parameter varying (LPV) methods.

Figure 6C:
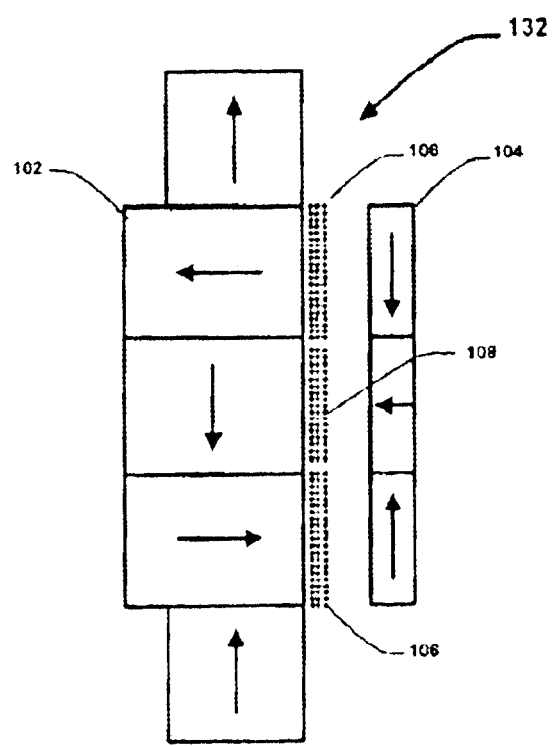
FIG. 6c shows a cross-sectional view of a shear force levitator combined with lateral and vertical stabilization coils.

In accordance with an alternative embodiment as shown in FIG. 6c, the lateral and vertical stabilization coils are combined with the magnetic levitator arrays to form a levitation/stabilization assembly 132. The coils and magnet arrays function as previously described, but when used in this combination the need for independent stabilization magnet array 104 as shown in FIG. 5b is eliminated.

Other integrated stabilization techniques may also be implemented. For example, when a moving magnet array mounted on a ring such as the motor magnet array 110 of FIG. 5b spins past shorted stationary coils such as motor coils 112, it induces current in these coils. This current produces a magnetic field that repels the magnet array. Such coils may be cross-connected between opposite sides of the ring so that the induced currents in each coil cancel and the repulsive force disappears when the ring is precisely centered about the coils. If the ring moves off center, for example if one side moves closer to the coils and the other side moves farther away, the induced current produced in the coils on the side that is closer to the spinning array will exceed the current produced at the other side of the array and create a repulsive force that tends to push the ring back into alignment. This passive or "null-flux" stabilization technique requires no gap sensors or electronic control system.

An active stabilization technique known as an "integrated motor/bearing" may also be implemented. This technique makes direct use of the motor magnets and coils to provide ring control. Gap sensors are used to detect deviations in ring centering, and a control system then produces electric currents in certain of the motor coils to interact with the motor's spinning magnet array to create a restoring force that re-centers the ring.

A third stabilization technique that may be implemented is to circumvent Earnshaw's theorem by replacing the lateral damping coil 106 of FIGS. 6a and 6b with superconducting material, such as a high temperature yttrium, barium, copper oxide superconductor or the like. By means of the Meisner effect, the superconducting material interacts with the moving magnet array 104 to create a lateral repulsive force. If properly sized this force will provide a positive lateral stiffness larger than the negative lateral stiffness or instability produced by the shear force levitator, thus producing a laterally stable system. The high temperature superconducting material may be embedded in the stationary interior wall of the storage ring system and maintained at cryogenic temperatures using liquid nitrogen coolant.

Figure 7A:
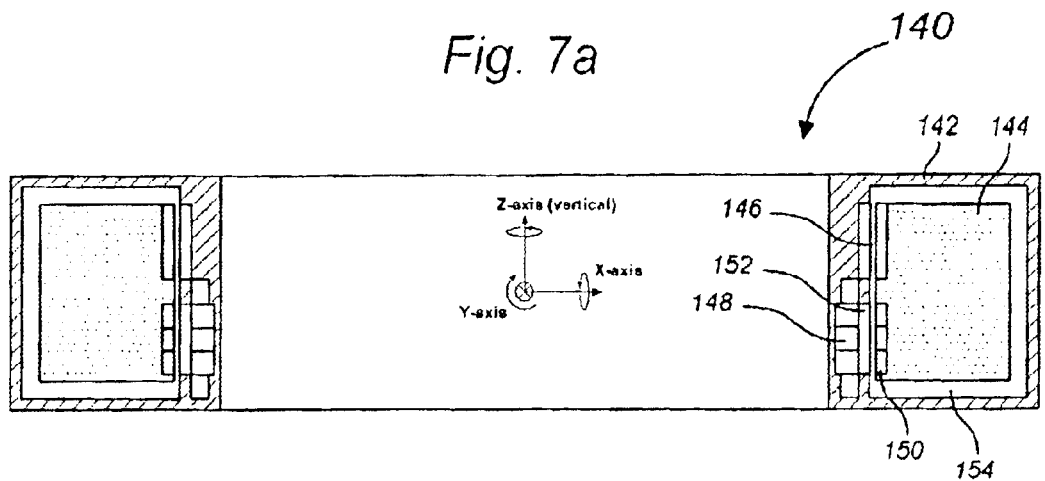
FIG. 7a shows a cross-sectional view of a second preferred embodiment of the energy storage ring.
Figure 7B:
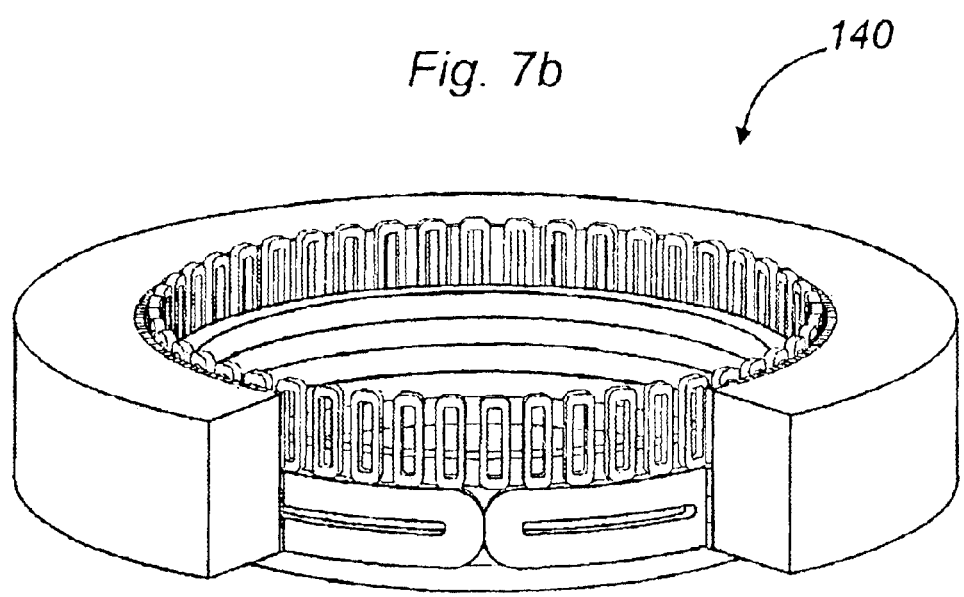

A second preferred embodiment 140 of an energy storage ring is illustrated in a sectional view in FIG. 7a and in a partial cutaway perspective view in FIG. 7b. This embodiment employs a single combined levitation/stabilization assembly comprised of a stationary magnet array 148, a moving magnet array 150, and a stabilization actuator 152. The levitation/stabilization assembly occupies the lower portion of the spinning ring 144, while a motor/generator 146 occupies the upper portion. The ring 144 spins inside a vacuum chamber 154 enclosed by a containment vessel 142. This embodiment minimizes the vertical height of the storage ring, allowing its use in vertically confined spaces, and also reduces the number of components to lower cost. For use in mobile applications, such as hybrid electric vehicles, the storage ring can be supported by shock isolation mounts and a 2-axis gimbal located either in the center of the ring, where there are no other components, or outside the ring.

Figure 8A:
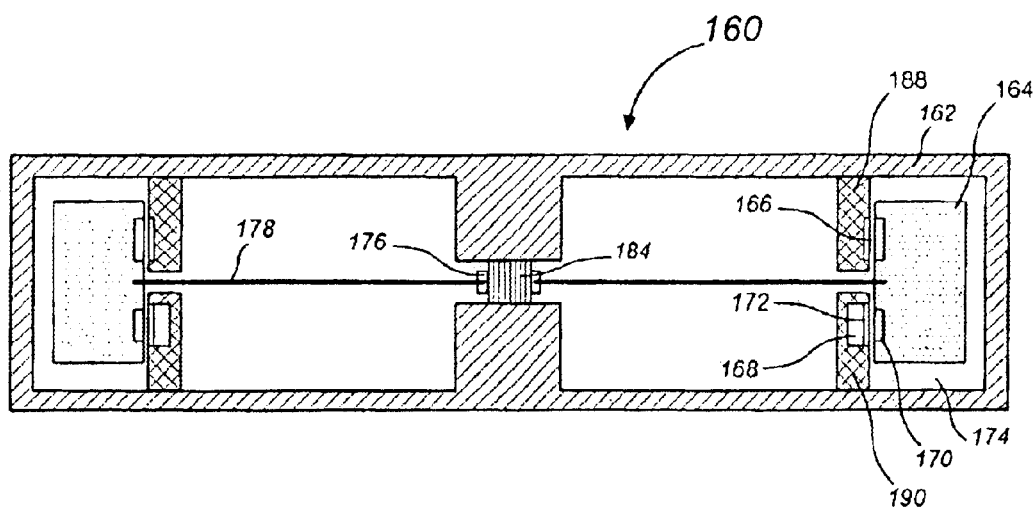
FIG. 8a shows a cross-sectional view of a third preferred embodiment of the energy storage ring.

A third preferred embodiment 160 of an energy storage ring is illustrated in a sectional view in FIG. 8a. This embodiment employs a single combined levitation/stabilization assembly comprised of a stationary magnet array 168, a moving magnet array 170, and a stabilization actuator 172. The levitation/stabilization assembly occupies the lower portion of the spinning ring 164, while a motor/generator 166 occupies the upper portion. The ring 164 spins inside a vacuum chamber 174 enclosed by a containment vessel 162. This embodiment employs an axle 184, a bearing 176, and a centering spring 178. As described previously, the shear force levitator is vertically stable and laterally unstable. Lateral stabilization requires little or no force when the ring is centered, so to keep stabilization forces and power consumption small it is advantageous to keep the ring close to the center of rotation. In the previous two embodiments stabilization is accomplished electro-magnetically using actuators. In the third embodiment stabilization is accomplished mechanically using a centering spring 178. The spring is comprised of thin bands, typically constructed out of carbon fiber or some other composite material, stretched between spinning rim 164 and central bearing 176. These bands stretch at the same rate as the rim and always remain in tension. Unlike spokes, they do not provide vertical support to the rim, nor do they damp vibrations. Their only function is to keep the rim centered. A central bearing 176 can be a conventional small-gap active magnetic bearing that rotates around the axle 184. However, due to the relatively large diameter of the rim, the maximum spin rate is rather modest compared to conventional flywheels, allowing the use of passive silicon-nitride ball bearings or other high-strength mechanical bearings. The third embodiment is preferred for its robust, passive design with the potential for very low cost.

Figure 8B:
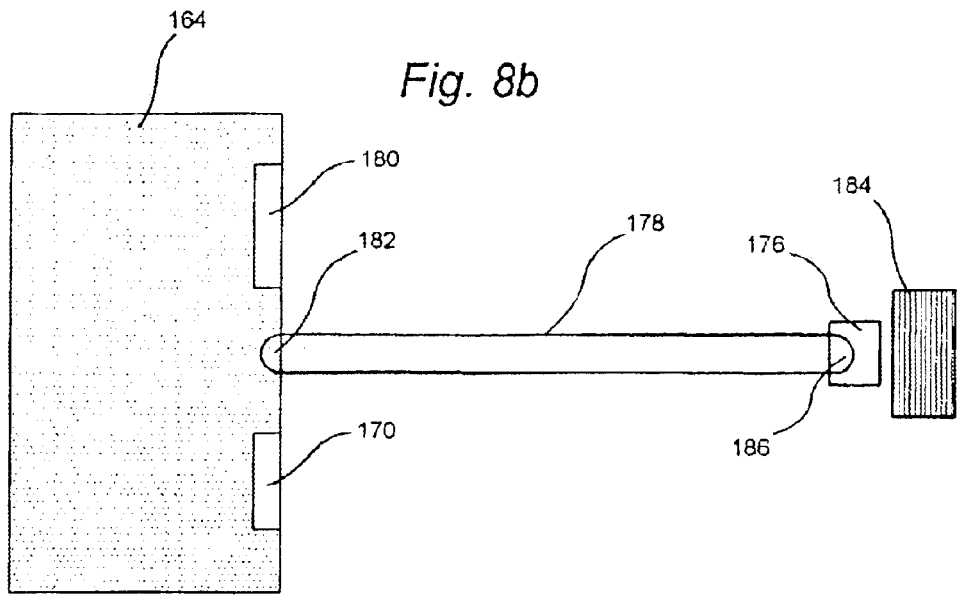

FIG. 8b provides an expanded cross-sectional view of one side of the storage ring 164, centering spring 178, bearing 176, and axle 184 of the third preferred embodiment. In this design the centering spring 178 is a thin, continuous composite strip that wraps around a segment 182 of the ring and a segment 186 of the bearing. Carbon, glass, or other high-strength fibers in the composite strip extend in the radial direction, supplying high positive stiffness to offset the negative radial stiffness of the shear force levitator. Segment 182 of the ring 164 may be ballasted or constructed of a substance with higher density that the bulk ring material to ensure that it always presses against the ring 164, even as the ring expands with increasing speed of rotation, and keeps centering spring 178 in tension. Other constructions may be utilized to accomplish the same effect. In any case, ring suspension and vibration damping is controlled via magnet arrays mounted on ring 164 itself, and does not involve centering spring 178. This frees the centering spring from many of the requirements and constraints of a conventional spoked-wheel design. As shown in FIGS. 8a and 8b, centering spring 178 is placed at the vertical center of the ring 164, but in other embodiments it may be placed at the top, bottom or anywhere in between the top and bottom on the ring.

FIG. 9a illustrates a fourth preferred embodiment 200 of an energy storage ring that is preferred for very large diameter storage rings. The fourth preferred embodiment is similar to the first preferred embodiment of FIGS. 5a and 5b, with the addition of a stationary core 202 and linear actuators 204. The inner containment wall 92 of FIGS. 5a and 5b is replaced with support segments 206 that are supported on the end of the linear actuators 204. In operation, ring 208 will expand as its speed of rotation increases and widen gap 212 between ring 208 and support segments 206. Due to the large diameter of ring 208, the gap 212 may exceed the maximum practical gap width achievable with the shear force levitator. For example, if the ring 208 is 10 meters in diameter and fabricated using a relatively low modulus material, such as E-glass, it may expand by as much as 2% (20 cm) or more, increasing gap 212 by nearly 7 centimeters. Gap sensors are employed to continuously measure the gap width 212 and supply the measurements to a control computer. To compensate for an increase in gap width 212 the control computer activates linear actuators 204 to move support segments 206 outward to maintain the optimal gap distance between the support segments 206 and the ring 208. When energy is extracted and the ring 208 contracts, the control computer detects a decrease in gap width 212 and activates the actuators 204 to retract the support segments 206 to maintain the optimum gap width. Each support segment 206 is moved by three columns of actuators, thus providing the capability to bend each support segment 206 to modify its radius of curvature in accordance with the radius of curvature of the ring 206. In other embodiments each support segment 206 may be moved by more or less than three columns of actuators.

Figure 9B:
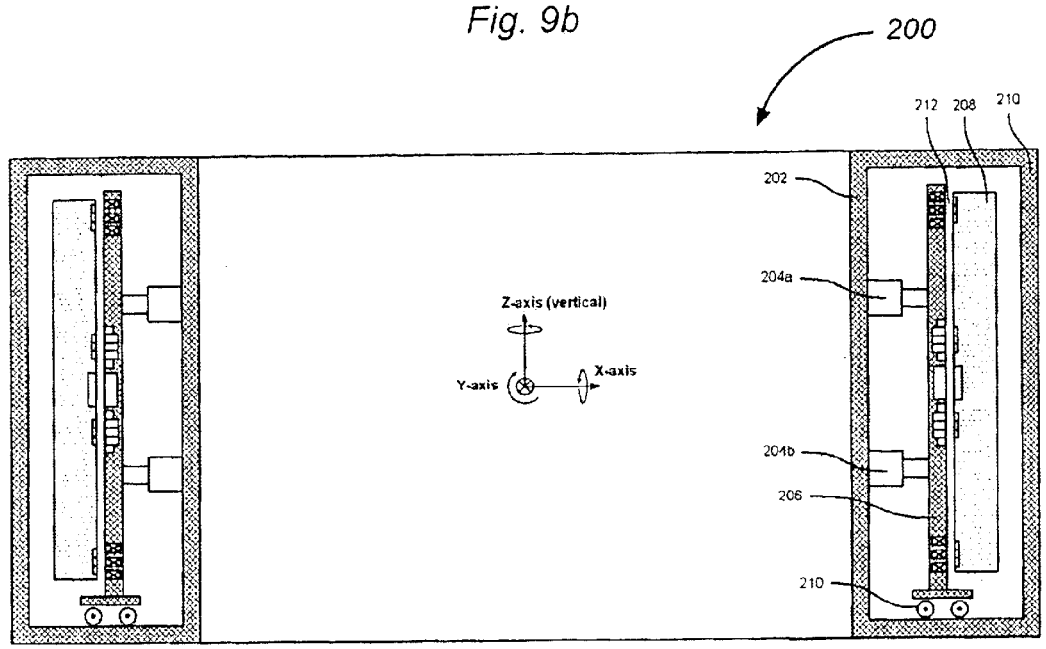

FIG. 9b depicts a sectional view of the structure of FIG. 9a along line B–B'. A stationary core 202 supports the linear actuators 204a and 204b that move the support segments 206. Two rows of actuators 204a and 204b are shown, but more or less may be used. The support segments 206 move on bearings 210, which may be rotating mechanical bearings, lubricated sliding bearings, magnetic bearings, or the like. The ring motor/generator, magnetic suspension, and stabilization system remain as in the previous embodiments.

The linear actuators 204 depicted in FIGS. 9a and 9b may be electromagnetic, pneumatic, or hydraulic, or may be ball screws or any other type of actuator that produces linear motion of adequate range and force. Alternatively, the support bearings 210 may include powered wheels to provide radial movement for the support segments 206.

The energy storage ring 200 of the fourth preferred embodiment has no fundamental restriction on ring diameter. A one-meter diameter ring is feasible as is a one-thousand-meter diameter ring. Since the spinning ring 208 must be fabricated as a single component, rings beyond a nominal size of about two to ten meters in diameter typically cannot be fabricated in a central facility as their size will be too large for transport. In such cases the ring may be fabricated on site. First, the entire energy storage ring system, except for the ring 208, is constructed on site. Since this portion of the system may consist of conventional structures, such as a reinforced concrete containment shell, and individually transportable components such as actuators, bearings, and movable support segments, this process follows conventional construction methods. Next, with actuators 204 in the fully retracted position, a thin-walled mandrel with an outside diameter the same size as the inside diameter of ring 208 to be fabricated is assembled, from segments, in position around movable support segments 206. A narrow gap, such as 1–2 centimeters, is left between the mandrel and the movable support segments 206. The magnet arrays for the levitators, stabilizers, and motor rotor are then mounted on the outside surface of the mandrel in the positions they will occupy in the completed ring. The mandrel is then levitated and stabilized by the magnetic suspension system in the operational ring position. Fiber strands or parallel-fiber prepreg tape of the material chosen for the ring, such as E-glass, carbon fiber, other high strength, lightweight fibers, or even metal wires, are then attached to the mandrel. Using the ring motor-generator for propulsion, the mandrel is placed in motion spinning slowly around the ring support segments 206. As the mandrel spins, fiber or tape is fed from rolls, coated with epoxy or other suitable adhesive, or heated to soften prepreg adhesive, and wrapped around the mandrel. Wrapping continues until the ring is built up to its intended thickness. The mandrel may then be removed, or left in place to serve as a protective inner surface for the ring in normal operation. The vacuum chamber is then closed and sealed, the air is evacuated, and ring 208 begins operational tests.

A variety of levitated ring energy storage structures may therefore be implemented in accordance with various embodiments of the invention. In general terms, such structures are implemented as a levitated ring energy storage device that includes a round support structure having a first magnetic levitator array encircling its outer periphery, and a ring encircling the support structure and having a second magnetic levitator array encircling its inner periphery, such that the first and second magnetic levitator arrays interact to produce a vertical force that levitates the ring.

It will be apparent to those having ordinary skill in the art that the structures described herein are not necessarily exclusive of other structures, but rather that further structures and structural features may be incorporated into the above structures in accordance with the particular implementation to be achieved. Therefore, while the embodiments illustrated in the figures and described herein are presently preferred, it should be understood that these embodiments are offered by way of example only. The invention is not limited to a particular embodiment, but extends to various modifications, combinations, and permutations that are encompassed by the claims and their equivalents.

What is claimed is:

1. A levitated ring energy storage device, comprising:
a round support structure having at least a first magnetic stationary levitator encircling its outer periphery; and
a ring encircling the support structure and having at least a first magnetic ring levitator encircling its inner periphery, the stationary and ring levitators interacting to produce a vertical force that levitates the ring.

2. The energy storage device recited in claim 1, wherein each of the stationary and ring levitators has a rotating magnetization.

3. The energy storage device recited in claim 2, wherein each of the stationary and ring levitators comprises adjacent discrete bands arranged vertically, the polarity of each band being rotated in a common direction with respect to a preceding band.

4. The energy storage device recited in claim 3, wherein the at least one magnetic stationary levitator comprises discrete bands having polarities rotating in a first direction, and
wherein the at least one magnetic ring levitator comprises discrete bands having polarities rotating in a second direction opposite the first direction.

5. The energy storage device recited in claim 3, wherein the at least one magnetic ring levitator is optimized to reduce size and cost relative to the at least one magnetic stationary levitator array.

6. The energy storage device recited in claim 1, wherein each of the stationary and ring levitators is a Halbach array.

7. The energy storage device recited in claim 1, wherein the support structure is an inner wall of a containment vessel, and
wherein the containment vessel further comprises an outer wall encircling the ring.

8. The energy storage device recited in claim 7, wherein the containment vessel may be evacuated.

9. The energy storage device recited in claim 1, wherein the at least one magnetic stationary levitator is continuous around the support structure, and
wherein the at least one magnetic ring levitator is continuous around the ring.

10. The energy storage device recited in claim 1, wherein the at least one magnetic stationary levitator is embedded in the support structure.

11. The energy storage device recited in claim 1, wherein the at least one magnetic ring levitator is embedded in the ring.

12. The energy storage device recited in claim 1, wherein the support structure further has at least a second magnetic stationary levitator encircling its outer periphery, and
wherein the ring further has at least a second magnetic ring levitator encircling its inner periphery, the second stationary and ring levitators interacting to produce a vertical force that levitates the ring.

13. The energy storage device recited in claim 1, wherein the support structure further has vertical and lateral stabilization coils encircling its outer periphery, and
wherein the ring further has a magnetic stabilizer encircling its inner periphery, the vertical stabilization coils and the magnetic stabilizer interacting to vertically stabilize the ring, and the lateral stabilization coils and the magnetic stabilizer interacting to laterally stabilize the ring.

14. The energy storage device recited in claim 13, wherein the vertical stabilization coils comprise a single coil encircling the support structure in opposition to the magnetic stabilizer.

15. The energy storage device recited in claim 13, wherein the vertical stabilization coils comprise a plurality of coils arranged around the periphery of the support structure in opposition to the magnetic stabilizer.

16. The energy storage device recited in claim 15, wherein the respective vertical stabilization coils are individually connected to a controller for providing active vertical stabilization by energizing the respective vertical stabilization coils in accordance with signals from gap sensors provided on the support structure.

17. The energy storage device recited in claim 13, wherein the lateral stabilization coils comprise a plurality of voice coils arranged around the periphery of the support structure in opposition to the magnetic stabilizer.

18. The energy storage device recited in claim 17, wherein corresponding voice coils at opposite sides of the support structure are cross-wired to provide passive lateral stabilization.

19. The energy storage device recited in claim 13, wherein the lateral stabilization coils are connected to a controller for providing active lateral stabilization by energizing the respective lateral stabilization coils in accordance with signals from gap sensors provided on the support structure.

20. The energy storage device recited in claim 13, wherein the vertical stabilization coils are connected to a controller for providing active vertical stabilization by energizing the vertical stabilization coils in accordance with signals from gap sensors provided on the support structure.

21. The energy storage device recited in claim 13, wherein the magnetic stabilizer is continuous around the ring.

22. The energy storage device recited in claim 13, wherein the magnetic stabilizer comprises an magnetic stabilizer array comprises adjacent discrete bands arranged vertically, the polarity of each band being rotated in a common direction with respect to a preceding band.

23. The energy storage device recited in claim 13, wherein one of the at least one magnetic ring levitators is disposed near a vertical center of the ring, and first and second magnetic stabilizers are disposed near respective ends of the ring.

24. The energy storage device recited in claim 13, wherein one of the at least one magnetic ring levitators is disposed near a first end of the ring, and the magnetic stabilizer is disposed near a second end of the ring.

25. The energy storage device recited in claim 13, wherein the lateral stabilization coil comprises a superconducting material maintained in a superconducting state by a cooling system.

26. The energy storage device recited in claim 1, wherein the support structure further has at least one vertical stabilization coil and lateral stabilization coils encircling its outer periphery and disposed between one of the at least one magnetic stationary levitators and a corresponding one of the at least one magnetic ring levitators, the at least one vertical stabilization coil and the magnetic ring levitator interacting to vertically stabilize the ring, and the lateral stabilization coils and the magnetic ring levitator interacting to laterally stabilize the ring.

27. The energy storage device recited in claim 26, wherein the at least one vertical stabilization coil comprises a single coil encircling the support structure in opposition to the magnetic ring levitator.

28. The energy storage device recited in claim 26, wherein the at least one vertical stabilization coil comprises a plurality of coils arranged around the periphery of the support structure in opposition to the magnetic ring levitator.

29. The energy storage device recited in claim 28, wherein the respective vertical stabilization coils are individually connected to a controller for providing active vertical stabilization by energizing the respective vertical stabilization coils in accordance with signals from gap sensors provided on the support structure.

30. The energy storage device recited in claim 27, wherein the lateral stabilization coils comprise a plurality of voice coils arranged around the periphery of the support structure in opposition to one of the at least one magnetic ring levitators.

31. The energy storage device recited in claim 30, wherein corresponding voice coils at opposite sides of the support structure are cross-wired to provide passive lateral stabilization.

32. The energy storage device recited in claim 27, wherein the lateral stabilization coils are connected to a controller for providing active lateral stabilization by energizing the respective lateral stabilization coils in accordance with signals from gap sensors provided on the support structure.

33. The energy storage device recited in claim 27, wherein the vertical stabilization coil is connected to a controller for providing active vertical stabilization by energizing the vertical stabilization coil in accordance with signals from gap sensors provided on the support structure.

34. The energy storage device recited in claim 1, wherein the support structure further has motor/generator coils encircling its outer periphery, and
wherein the ring further has a magnetic motor/generator array encircling its inner periphery in opposition to the motor/generator coils.

35. The energy storage device recited in claim 34, wherein the motor/generator coils are connected to a controller for providing active lateral stabilization by energizing the respective motor/generator coils in accordance with signals from gap sensors provided on the support structure.

36. The energy storage device recited in claim 34, wherein the support structure further has at least a first and second magnetic stationary levitator encircling its outer periphery,
wherein the ring further has at least a second magnetic ring levitator encircling its inner periphery, the second stationary and ring levitators interacting to produce a vertical force that levitates the ring,
wherein the magnetic motor/generator array is located at approximately a vertical center of the ring,
wherein the first and second magnetic ring levitators are located adjacent to and at opposing sides of the magnetic motor/generator array, and
wherein the ring further has a second magnetic stabilizer encircling its inner periphery, the first and second magnetic stabilizers being disposed near respective ends of the ring.

37. The energy storage device recited in claim 34, wherein the motor/generator array is disposed near a first end of the ring, and
wherein the at least one magnetic ring levitator is disposed near a second end of the ring.

38. The energy storage device recited in claim 1, further comprising centering springs extending from the inner periphery of the ring to a central axle.

39. The energy storage device recited in claim 38, wherein the centering springs comprise carbon fiber.

40. The energy storage device recited in claim 38, wherein the centering springs are connected to the ring using a connector having a higher density than the ring.

41. The energy storage device recited in claim 1, wherein the support structure comprises segments supported by respective actuators for moving the segments radially.

42. The energy storage device recited in claim 41, wherein the actuators are controlled by a controller for moving the segments in accordance with signals from gap sensors provided on the support structure.

43. The energy storage device recited in claim 41, wherein each of the segments is supported by three individually moveable actuators for changing a radius of curvature of the corresponding segment.

44. A method of energy storage, comprising energizing motor/generator coils encircling a support structure having at least one magnetic stationary levitator encircling its outer periphery and having a ring encircling the support structure, the ring having at least one magnetic ring levitator encircling its inner periphery, the stationary and ring levitators interacting to produce a vertical force that levitates the ring, and the ring further having a magnetic motor/generator array encircling its inner periphery in opposition to the motor/generator coils, wherein energizing the motor/generator coils accelerates rotation of the ring around the support structure.

45. A method of fabricating a levitated ring energy storage device, comprising:
constructing a round support structure having at least one magnetic stationary levitator and motor/generator coils encircling its outer periphery;
assembling a mandrel around the support structure;
forming at least one magnetic ring levitator and a magnetic motor/generator at an outer periphery of the mandrel;
levitating the mandrel by a vertical force produced through interaction of the stationary and ring levitators such that the magnetic motor/generator opposes the motor/generator coils; and
wrapping a ring material around the mandrel while spinning the mandrel.

46. The method recited in claim 45, wherein the mandrel is spun by energizing the motor coils.

47. The method recited in claim 45, wherein the support structure comprises a plurality of segments supported by respective actuators for moving the segments in a radial direction, and
wherein the mandrel is assembled around the support structure while the segments are in a retracted position.

48. The method recited in claim 45, wherein the ring material comprises a fiber material and an adhesive material.

* * * * *